3,178,397
WATER-SOLUBLE ACRYLIC COPOLYMERS CONTAINING QUATERNARY AMMONIUM GROUPS AND INCLUDING N-VINYL PYRROLIDONE TYPE COMONOMER
Oskar Olaj, Vienna, Austria, and Arthur Maeder, Therwil, Switzerland, assignors to Ciba Limited, Basel, Switzerland, a company of Switzerland
No Drawing. Filed Sept. 24, 1962, Ser. No. 225,890
Claims priority, application Switzerland, Sept. 25, 1961, 111,113/61
5 Claims. (Cl. 260—80.5)

The manufacture of copolymers of N-vinyl pyrrolidone and of other 2-oxo-N-vinyl-heteocyclic compounds is known. It is also known that quaternated amino-amides of acrylamides can be copolymerized with other monomers.

It has now been found that valuable, water-soluble copolymers are obtained when the following compounds are copolymerized by known methods:

(1) A 2-oxo-N-vinyl-heterocyclic compound which is saturated in the ring,
(2) A salt obtained by quaternating an aminoamide of the acrylamide series, preferably one quaternated with chloracetamide,
(3) Acrylic or methacrylic acid, or an alkali metal salt thereof, primarily the sodium or potassium salt, and, if desired,
(4) Acrylamide or methacrylamide.

The present invention provides a process for the manufacture of water-soluble copolymers containing quaternary ammonium groups by additive polymerization of ethylenically unsaturated monomers, wherein (1) 10 to 75 mols percent of a 2-oxo-N-vinyl-heterocyclic compound which is saturated in the ring,
(2) 10 to 45 mol percent of a quarternated N:N-dialkyl-aminoalkyl acrylamide or methacrylamide,
(3) 10 to 45 mol percent of acrylic or methacrylic acid or of an alkali metal salt thereof, and
(4) 0 to 60 mol percent of acrylamide or methacrylamide
are polymerized in an aqueous medium with the aid of a free-radical-yielding catalyst.

As 2-oxo-N-vinyl-heterocyclic compounds there are suitable aliphatic heterocyclic compounds that contain a saturated ring and 5 or 6 cyclic atoms of which one is a vinyl-substituted nitrogen atom, and in α-position thereto there is a carbonyl group. The other cyclic atoms are carbon, nitrogen or oxygen; the carbon and nitrogen atoms may be substituted by lower alkyl radicals.

The 2-oxo-N-vinyl-heterocyclic compounds to be used in the present process correspond to the general formula

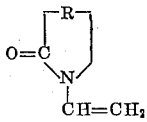

in which R represents a divalent, saturated (and possibly substituted) aliphatic radical containing 3 to 4 carbon atoms of which at most one is replaced by nitrogen or oxygen. R may be, for example, the grouping

—CH$_2$CH$_2$CH$_2$—

(pyrrolidone), —CH$_2$CH$_2$CH$_2$CH$_2$— (piperidone),

—CH$_2$CH$_2$NH—

(pyrazolidone). —NHCH$_2$CH$_2$— (ethyleneurea),

—NHCH$_2$CH$_2$CH$_2$—

(trimethyleneurea) or —OCH$_2$CH$_2$— (oxazolidone).

Suitable compounds are N-vinyl oxazolidone and its 5-methyl or 5-ethyl substitution products, N-vinyl-N:N'-ethyleneurea, N-vinyl-N:N'-trimethyleneurea and more especially N-vinyl pyrrolidone. The copolymer of the invention contains 10 to 75, preferably 20 to 70, mol percent of the vinyl-heterocyclic compound.

As basic derivatives of the acrylamide series—which are quaternated with chloracetic acid ester, ethylene chlorohydrin, dimethyl sulfate, triethyl phosphite or more especially with chloracetamide—there are suitable N:N-dimethylamino-propylacrylamide, N:N-dimethyl- or N:N-diethylamino-ethylacrylamide and more especially N:N-diethylamino-propylacrylamide and the corresponding derivatives of methacrylamide. These compounds correspond to the general formula

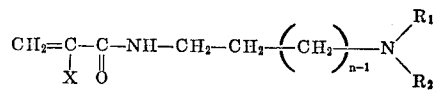

in which X represents a hydrogen atom or a methyl group, $n=1$ or preferably 2, $R_1$ and $R_2$ each represents a lower alkyl radical with 1 to 3 carbon atoms, preferably the methyl or ethyl radical and, together with the nitrogen atom, they represent a heterocycle containing 5 or 6 cyclic members. The quaternated products correspond to the general formula

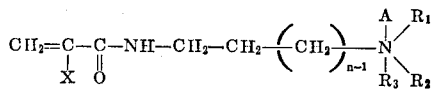

in which X, $n$, $R_1$ and $R_2$ have the above meanings and $R_3$ represents the organic radical, left after elimination of the anion, of a quaternating agent, more especially the radical —CH$_2$CONH$_2$, and A stands for the salt-forming component (anion) of a quaternating agent, more especially a halogen atom. The amount of quaternated monomer contained in the copolymer ranges from 10 to 45, preferably from 15 to 40, mol percent.

The third component to be used in the present process belongs to the acrylic acid series and is acrylic or methacrylic acid, or advantageously an alkali metal salt thereof, such as sodium acrylate or potassium methacrylate, in an amount of 10 to 45, preferably 15 to 40, mol percent.

If desired, the copolymer may contain as a fourth component acrylamide or methacrylamide in an amount of up to 60 mol percent.

For the polymererization the monomers are dissolved in water or in a water-soluble solvent and polymerized at a temperature ranging from 40 to 90°, preferably from 50 to 80° C., with the end of a water-soluble free-radical catalyst for about 4 to 8 hours. Suitable catalysts are the known water-soluble or restrictedly water-soluble peroxidic catalysts and/or azo-catalysts, for example potassium persulfate, hydrogen peroxide, peracetic acid, azo-diisobutyric acid and azo-di-isobutyronitrile.

Alternatively, the copolymerization may be carried out with the unquaternated basic component (2), which is then followed by quaternation performed on the polymer.

The water-soluble copolymers of the invention are suitable as thickeners, as protective colloids, as antistatic agents and more especially as levelling agents for dyeing with vat dyestuffs. The use of the copolymers of the invention ensures very good dyestuff exhaustion and the dyeings obtained are level, while with the oligomers or homopolymers of vinyl pyrrolidone only one of these two results can be achieved. It is possible, for example, to add the copolymer to the dyebath so that it develops its levelling action during the dyeing process. It is also possible to level spotty dyeings subsequently with the aid of the copolymer present in an alkaline bath containing hydrosulfite. The amount of copolymer to be added to the treatment bath may vary within rather wide limits and is advantageously about 0.25 to 5 parts of copolymer in 1000 parts by volume of water. The weaker dyeings obtained with some vat dyestuffs when dyeing in hard water (20° German hardness) are appreciably improved with as little as 0.25 g. of copolymer per liter.

The copolymers of the invention are especially suitable for vat dyestuffs used in the so-called hot-dyeing method, that is to say at a temperature ranging from 50 to 70, or advantageously from 55 to 65° C. In machine dyeing the liquor concentration is 1:5 to 1:20 and in piece dyeing 1:20 to 1:100.

Examples of suitable vat dyestuffs are the following:

(1) The blue dyestuff obtained by stove-melting from methylbenzanthrone,
(2) the black dyestuff (polyanthrimide), from
    1 mol of tetrabromopyranthrone,
    2 mols of 1-aminoanthraquione, and
    2 mols of aminodibenzanthrone,
(3) the violet dyestuff of the formula

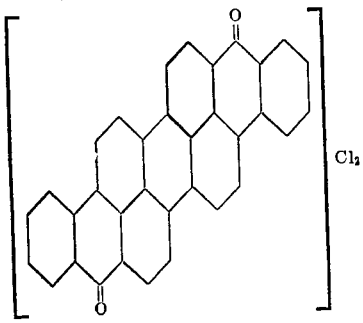

Unless otherwise indicated, parts and percentages in the following examples are by weight.

*Example 1*

(a) 56.3 g. of N-vinyl pyrrolidone (70 mol percent), 70.4 g. of an aqueous solution of 50% strength of diethylaminopropylacrylamide quaternated with chloracetamide (17.5 mol percent) and 25.5 g. of an aqueous solution of 33.3% strength of sodium acrylate (12.5 mol percent) are mixed with 148 g. of water in 500 ml. three-necked flask equipped with a mechanical stirrer, which has been scavenged with nitrogen, with exclusion of air. 0.5 ml. of a concentrated aqueous ammonia solution is then added. The batch is heated on a water bath to an internal temperature of 60° C. and 0.2 g. of potassium persulfate is added, whereupon after a short time polymerization sets in. After two hours another 0.2 g. of potassium persulfate is added, after another 2 hours the temperature is raised to 70° C. and another addition of 0.2 g. of catalyst is made. If necessary the completion of the polymerization can be assisted by adding 0.1 g. of azo-di-isobutyronitrile. After a total reaction time of 7 hours a clear, viscous solution containing about 33% of polymer is obtained.

(b) When, instead of with the amounts specified above, the reaction is performed with 45.0 g. of N-vinyl pyrrolidone (60 mol percent), 89.8 g. of the aqueous solution of 50% strength of diethylamino propylacrylamide quaternated with chloracetamide (24 mol percent) and 30.3 g. of an aqueous solution of 33.3% strength of sodium acrylate (16 mol percent) and dilution is performed with 134.9 g. of water, the process described above furnishes a likewise clear polymer solution having a dry content of 33%.

*Example 2*

(a) Approximately one third of a solution of 71.2 g. of N-vinyl pyrrolidone (50 mol percent), 103.4 g. of diethylaminopropylacrylamide quaternated with chloracetamide (29 mol percent), and 25.4 g. of sodium acrylate (21 mol percent) in 400 g. of water, further containing 1 ml. of triethylamine and 0.75 g. of potassium persulfate, is charged into a 1-liter three-necked flask equipped with a dropping funnel and a stirrer and scavenged with nitrogen. On heating polymerization sets in at about 50 to 55° C. The remainder of the batch is then added dropwise within 1 to 2 hours, while making sure that the internal temperature does not rise above 70° C. On completion of the dropwise addition another 0.5 g. of potassium persulfate is added in two portions and, if necessary, 0.1 to 0.2 g. of azo-di-isobutyronitrile, while maintaining the temperature at 70° C. Within 6 to 8 hours from the beginning of the reaction a clear polymer solution is obtained which has a dry content of about 33%.

(b) When, instead of with the monomer amounts specified above, the reaction is performed with 53.8 g. of N-vinyl pyrrolidone (40 mol percent), 117.6 g. of diethylaminopropylacrylamide quaternated with chloracetamide (35 mol percent) and 28.6 g. of sodium acrylate (25 mol percent) as described under 2(a) above, a highly viscous, clear polymer solution having a polymer content of about 33% is likewise obtained. Instead of 25 mol percent of sodium acrylate there may be used an equivalent quantity (21.9 g.), of acrylic acid, and in this case the polymer solution has a dry content of about 31%.

*Example 3*

(a) A mixture of 13.0 g. of N-vinyl pyrrolidone (20 mol percent), 130.0 g. of an aqueous solution of 50% strength of diethylamino-propylacrylamide quaternated with chloracetamide (40 mol percent), 66.0 g. of an aqueous solution of 33.3% strength of sodium acrylate (20 mol percent), 0.25 ml. of a concentrated aqueous ammonia solution, 0.25 ml. of triethylamine and 76 g. of water is heated in a flask to 50° C., and polymerization is initiated by adding a solution of 0.2 g. of potassium persulfate in 5 ml. of water. The reaction is completed by making two further addition of 0.2 g. of potassium persulfate in 5 ml. of water at a temperature of 60 to 80° C., whereupon a viscid, clear solution containing 33% of polymer is obtained.

(b) When the reaction described above is performed, instead of with the ingredients stated, with 60.3 g. of N-vinyl pyrrolidone (70 mol percent), 53.8 g. of an aqueous solution of 50% strength of diethylamino-propylacrylamide quaternated with chloracetamide (12.5 mol percent), 38.4 g. of an aqueous solution of 33% strength of sodium acrylate (17.5 mol percent) and 133 g. of water, a faintly yellowish, but clear polymer solution is obtained which has a dry content of about 33%.

*Example 4*

49.7 g. of N-vinyl pyrrolidone (60 mol percent), 36.2 g. of diethylamino-propylacrylamide quaternated with chloracetamide (17.5 mol percent), 8.8 g. of sodium acrylate (12.5 mol percent) and 5.3 g. of acrylamide (10 mol percent) are dissolved in 185 g. of water; the solution is mixed with 0.5 ml. of concentrated aqueous ammonia solution and introduced in a polymerization vessel. After heating the batch to 50 to 60° C. the polymerization is initiated by adding 0.2 g. of potassium persulfate in 5 ml. of water, and this addition is repeated twice more at 2 hour intervals. After about 6 hours a viscous, clear solution has formed which contains about 33% of polymer. The acrylamide used above may be replaced by an equimolecular proportion (6.3 g.) of methacrylamide.

*Example 5*

A mixture of 9.7 g. of N-vinyl pyrrolidone (10 mol percent), 42.6 g. of diethylamino-propylacrylamide quaternated with chloracetamide (17.5 mol percent), 10.3 g. of sodium acrylate (12.5 mol percent), 37.4 g. of acrylamide (60 mol percent) in 40 g. of isopropanol and 160 g. of water is stirred in a polymerization vessel until a clear solution has formed, which is heated to 50° C. The polymerization is initiated by adding 0.2 g. of potassium persulfate; during the violent first phase of the reaction the vessel is cooled externally to prevent excessive heating of the batch by the developed heat of polymerization. By further portionwise addition of 0.2 g. of potassium persulfate the reaction is completed, to yield a highly viscous solution which contains 33% of polymer. The sodium acrylate used above may be replaced by an equivalent amount (11.8 g.) of sodium methacrylate.

*Example 6*

(a) When in Example 1(a) the 70 mol percent of N-vinyl pyrrolidone are replaced by vinyl oxazolidone (57.3 g.), all other ingredients being identical, the process described furnishes a clear, faintly colored polymer solution having a dry content of 33 to 34%.

(b) When the 53.8 g. of N-vinyl pyrrolidone (40 mol percent) are replaced by an equivalent proportion (54.8 g.) of N-vinyl oxazolidone in the process described in Example 2(b), a clear, viscid solution containing 33% of polymer is obtained.

*Example 7*

A dyebath is prepared which contains per liter 16 ml. of sodium hydroxide solution of 30% strength, 1 g. of sodium hydrosulfite, a levelling agent, and the dyestuff prepared by stove-melting methylbenzanthrone. Two pieces of cotton satin are immersed at an interval of 10 minutes at a bath temperature of 60 to 65° in the above liquor and moved about in it. The goods-to-liquor ratio used is 1:80. After 50 minutes the pieces of satin are taken out of the bath, and the vat dyeing is developed in the usual manner. After having been dried and ironed, the pieces of satin are examined with a brightness measuring instrument according to Dr. Lange with poly-disperse light against barium sulfate as standard (=100).

In a parallel experiment the procedure used is identical except for the omission of the levelling agent.

The data listed in the following table refer in all cases to a concentration of the levelling agent of 0.5 g. of active substance in one liter of the undermentioned copolymers and of the oligomers and homopolymers of N-vinyl pyrrolidone. In colum A there is shown the numerical value of the brightness of the first piece of fabric after having been dyed in the presence of the individual levelling agent, and column B contains the numerical value of the brightness of the first piece of fabric treated without addition of a levelling agent. The smaller the difference $A-B$ between the numbers of the two columns, the better is the dyestuff exhaustion or, alternatively, the weaker the retentive effect of the dyebath. In column C appears the difference of the numerical values of the brightness of the first and the second piece of fabric of the dyeing performed in the presence of a levelling agent. Accordingly, column C is a measure of the levelling effect achieved. The smaller this difference, the better the levelling effect of the individual agent.

| Copolymer as described in Example— | A | B | C |
|---|---|---|---|
| 1(a) | 25 | 13 | 3 |
| 1(b) | 25 | 13 | 3 |
| 2(a) | 22 | 13 | 3 |
| 2(b) | 21 | 13 | 4 |
| 3(a) | 20 | 13 | 5 |
| 3(b) | 19 | 13 | 4 |
| 4 | 25 | 13 | 3 |
| 5 | 18 | 13 | 6 |
| 6(a) | 24 | 13 | 3 |
| 6(b) | 23 | 13 | 4 |
| Oligomers of N-vinyl-pyrrolidone(*): | | | |
| (1) | 12 | 12 | 22 |
| (2) | 10 | 10 | 21 |
| (3) | 12 | 12 | 19 |
| Homopolymers of N-vinyl-pyrrolidone | 72 | 12 | 2 |

*Prepared according to German Auslegeschrift 1,040,031 with (1) 1%, (2) 0.4% and (3) 0.1% of sulfuric acid (diluted with an equal amount of glacial acetic acid).

*Example 8*

A mixture of 30 mol percent of vinyl pyrrolidone, 40 mol percent of diethylamino-propylacrylamide quaternated with chloracetamide and 30 mol percent of sodium acrylate is polymerized as described in Example 3. The resulting preparation has a dry content of about 34%.

27 g. of the above preparation are dissolved in 1 liter of water, and a polyamide fabric is impregnated with this solution to a weight increase of about 55%, then expressed and dried.

The treated fabric displays good antistatic properties.

What is claimed is:

1. A water-soluble copolymer containing quaternary ammonium groups which copolymer consists essentially of linear additively combined units of
   (1) 10 to 75 mol percent of a 2-oxo-N-vinylheterocyclic compound which is saturated in the ring,
   (2) 10 to 45 mol percent of a quaternated N:N-diloweralkyl-amino-lower alkylamide of the acrylic acid series,
   (3) 10 to 45 mol percent of an alkali salt of an acid of the acrylic acid series, and
   (4) 0 to 60 mol percent of an amide selected from the group consisting of acrylamide and methacrylamide.

2. A water-soluble copolymer containing quaternary ammonium groups which copolymer consists essentially of linear additively combined units of
   (1) 10 to 75 mol percent of a 2-oxo-N-vinyl-heterocyclic compound selected from the group consisting of N-vinyl-pyrrolidone, N-vinylpiperidone, N-vinyl-pyrazolidone, N-vinylethylene urea, N-vinyl-trimethyleneurea and N-vinyl-oxazolidone,
   (2) 10 to 45 mol percent of a quaternated N:N-diloweralkyl-amino-loweralkyl amide which N:N-diloweralkyl-amino-loweralkyl amide is selected from the group consisting of N:N-dimethylamino propylacrylamide, N:N-dimethylamino ethylacrylamide, N:N-diethylamino ethylacrylamide, N:N-diethylamino propylacrylamide and N:N-diethylamino proplymethacrylamide,
   (3) 10 to 45 mol percent of an alkali salt of an acid selected from the group consisting of acrylic acid and methacrylic acid, and
   (4) 0 to 60 mol percent of an amide selected from the group consisting of acrylamide and methacrylamide.

3. A water-soluble copolymer containing quaternary ammonium groups which copolymer consists essentially of linear additively combined units of
   (1) 10 to 75 mol percent of a 2-oxo-N-vinyl-heterocyclic compound selected from the group consisting of N-vinyl-pyrrolidone, N-vinyl-piperidone, N-vinyl-pyrazolidone, N-vinyl-ethylene urea, N-vinyl-trimethylene urea and N-vinyl-oxazolidone,
   (2) 10 to 45 mol percent of a quaternated N:N-diloweralkyl-amino-loweralkyl amide which N:N-diloweralkyl-amino-loweralkyl amide is selected from the group consisting of N:N-dimethylamino-propylacrylamide, N:N-dimethylamino ethylacrylamide, N:N-diethylamino ethylacrylamide, N:N-diethylamino propylacrylamide and N:N-diethylaminopropyl methacrylamide, and
   (3) 10 to 45 mol percent of an alkali salt of an acid selected from the group consisting of acrylic acid and methacrylic acid.

4. A water-soluble copolymer containing quaternary ammonium groups which copolymer consists essentially of linear additively combined units of
   (1) 10 to 75 mol percent of N-vinyl-pyrrolidone,
   (2) 10 to 45 mol percent of quaternated N:N-diethylaminopropyl acrylamide,
   (3) 10 to 45 mol percent of sodium acrylate, and
   (4) up to 60 mol percent of acrylamide.

5. A water-soluble copolymer containing quaternary ammonium groups which copolymer consists essentially of linear additively combined units of
  (1) 10 to 75 mol percent of N-vinyl-pyrrolidone,
  (2) 10 to 45 mol percent of quaternated N:N-diethyl-aminopropyl acrylamide, and
  (3) 10 to 45 mol percent of sodium acrylate.

References Cited by the Examiner

UNITED STATES PATENTS

| | | | |
|---|---|---|---|
| 2,818,362 | 12/57 | Drechsel | 260—77.5 |
| 3,008,851 | 11/61 | Zeitschel | 260—80.5 |

LEON J. BERCOVITZ, *Primary Examiner.*

DONALD E. CZAJA, *Examiner.*